Figure 1:
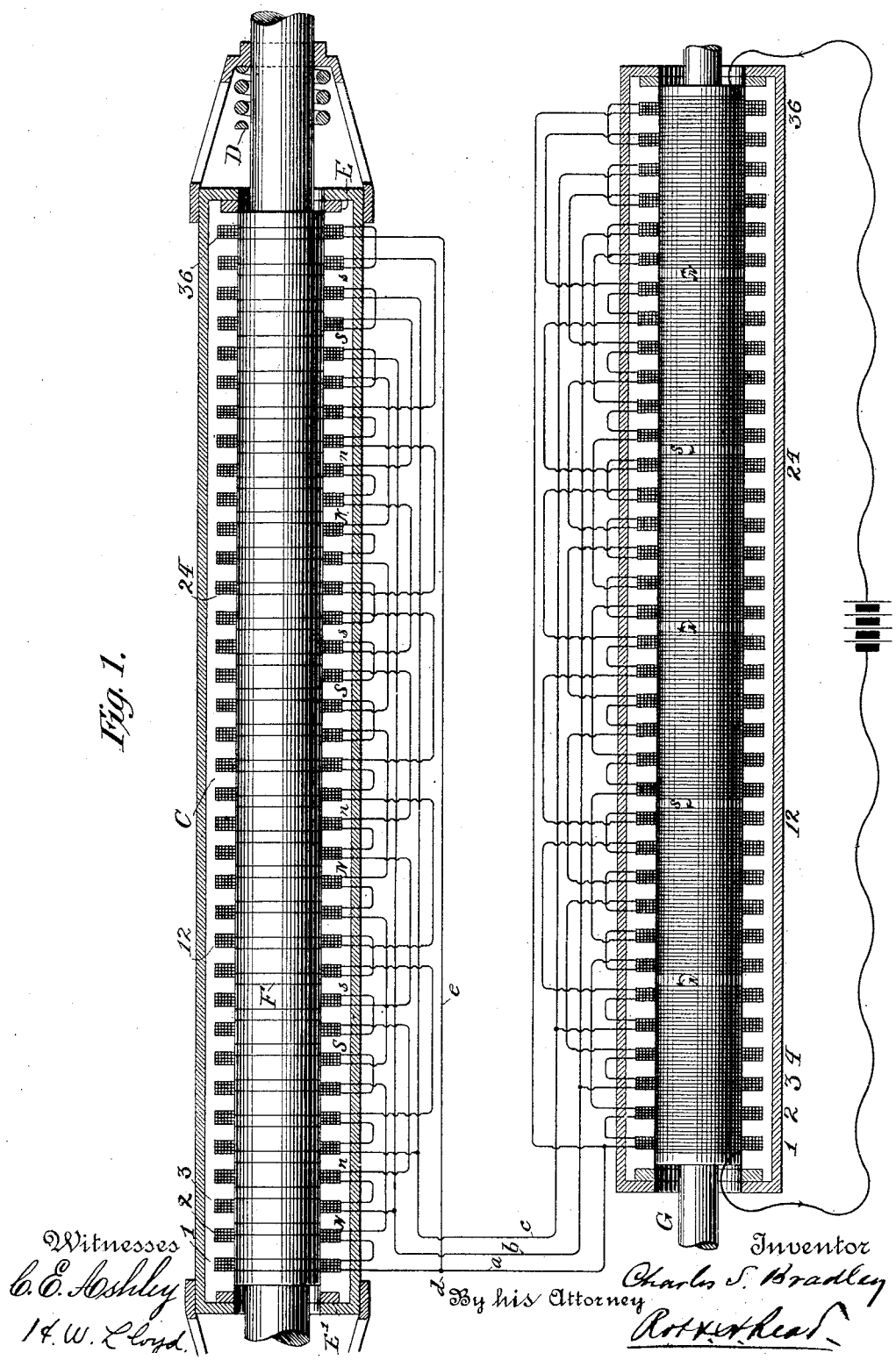

(No Model.) 2 Sheets—Sheet 1.

C. S. BRADLEY.
SYSTEM OF POWER TRANSMISSION.

No. 532,441. Patented Jan. 15, 1895.

(No Model.) 2 Sheets—Sheet 2.
C. S. BRADLEY.
SYSTEM OF POWER TRANSMISSION.
No. 532,441. Patented Jan. 15, 1895.
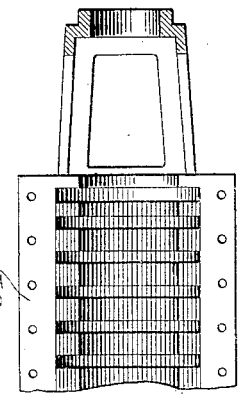
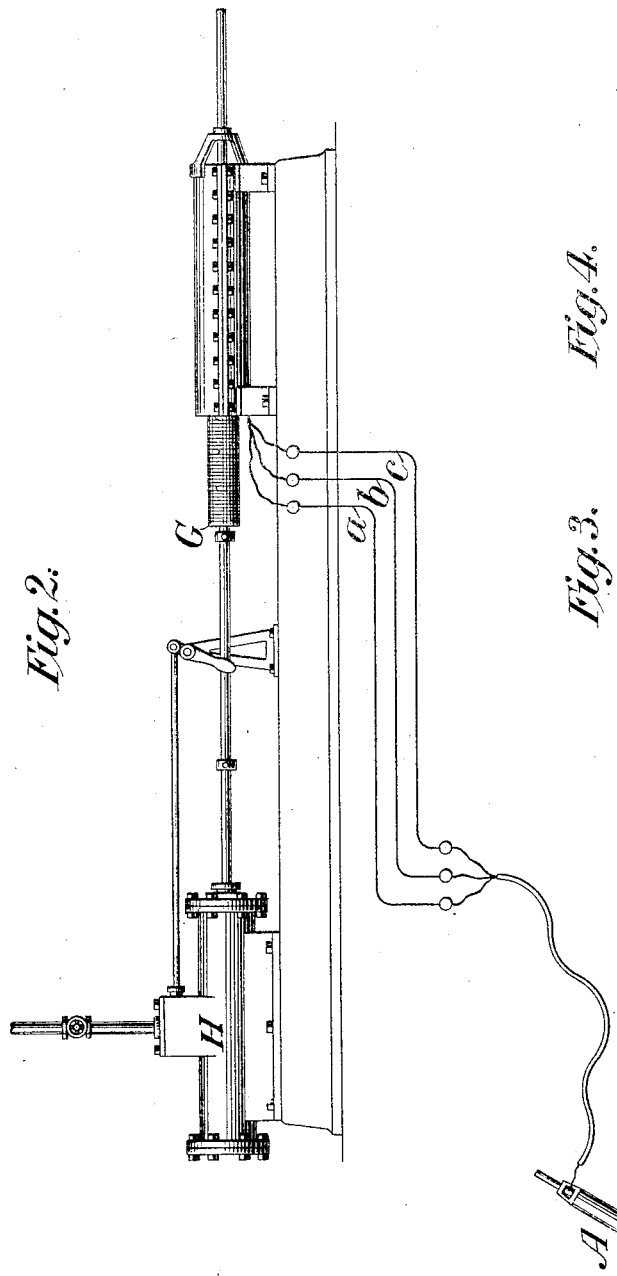
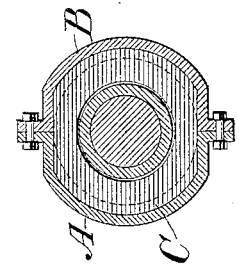
Witnesses
H. W. Lloyd.
John P. Nordström.
Inventor
Charles S. Bradley
By his Attorney
Robert Read.

UNITED STATES PATENT OFFICE.

CHARLES S. BRADLEY, OF AVON, NEW YORK.

SYSTEM OF POWER TRANSMISSION.

SPECIFICATION forming part of Letters Patent No. 532,441, dated January 15, 1895.

Application filed September 12, 1893. Serial No. 485,312. (No model.)

*To all whom it may concern:*

Be it known that I, CHARLES S. BRADLEY, a citizen of the United States, residing in Avon, in the county of Livingston and State of New York, have invented certain new and useful Improvements in the Transmission of Power by Alternating Currents and Generators Therefor, of which the following is a specification.

This invention relates to generators and systems for transmission of power involving the operation of reciprocatory electric motors.

In some types of motors, as, for example, electric drills, it is important to maintain a reciprocating movement, and the invention is particularly applicable to this class of devices. In motors of this kind as heretofore constructed the plunger or reciprocating tool when operated by alternating currents makes a stroke for each wave of current and therefore requires for its best operation a current of slow frequency.

In a prior application filed by me on or about the 20th day of August, 1892, Serial No. 443,599, was described a motor in which the reciprocating member was given a slow movement by the action of a number of co-operating alternating currents, the motor being so constructed that a number of current waves were necessary to produce a complete stroke. The invention described in said application involved a commutator for periodically changing the order of delivery of the alternating currents and thus reversing the direction of the tractive effort and producing reciprocation.

My present invention is designed to do away with the commutator and the incidental sparking accompanying it. With that end in view I provide a generator in which a reciprocating movement is also maintained so that the order of delivery of the several alternating currents will be automatically changed, without the use of a commutator, by the reciprocating motion of the generator. I provide a circuit comprising three or more wires and so wind the generator that a series of phasially different alternating currents will be transmitted over the wires. The generator will be provided with a permanently charged field-magnet and its armature wound so as to develop polyphase currents when there is relative movement between the field-magnet and the armature, and one of these will be connected to an engine or other device for producing reciprocatory movement. During movement in one direction the alternating currents will follow in a certain definite order with a definite amount of phase difference. During the reverse movement a change in the order of delivery will be effected by the mere change of direction of movement, and this change of delivery thus periodically effected will operate upon a motor similar in construction to the one described in the above mentioned application to produce a reciprocating movement of the drill or other device in which the mechanical energy is utilized.

The several features of novelty of the invention will be more particularly hereinafter described and will be definitely indicated in the appended claims.

In the accompanying drawings which illustrate the invention, Figure 1 is a partly diagrammatic view of a system showing part of a generator and motor involving my improvements, parts of the devices being shown in section. Fig. 2 is a general view of a system embodying my improvements. Fig. 3 is a transverse section of the motor; and Fig. 4 is a side elevation of part of a motor casing.

The motor comprises an exterior shell A, B, see Fig. 3, formed in sections, which may be bolted together, as indicated, within which shell are packed laminated iron plates C, the laminations extending longitudinally of the casing. The several plates are grooved so that when packed in the casing there will be formed on the inside a cylindrical recess adapted to contain the drill or motor plunger, and around said recess a series of circular grooves or indentations, in which the several coils 1, 2, 3, 4, &c., may be placed, which coils will be locked in position when the two halves of the inclosing shell are bolted together. The terminals of the several coils 1, 2, 3, 4, &c., may be carried out through channels or grooves formed at the junction surface of the two halves of the shell, so that the necessary connections may be made to produce a series of shifting poles when several phasially different alternating currents are led into the mains *a, b, c.*

At each end of the motor a suitable spring, as D, may be provided, against which a shoulder or projection on the plunger may impinge so as to reduce the shock to the apparatus in case the plunger makes a full stroke. Suitable guides are provided for keeping the plunger in proper alignment with the coils. The case containing the laminated plates may with advantage be made of iron and metallic collars E, E', may be provided to lock the laminated plates in firm contact with the casing and prevent any shifting and possible chafing of the coils. The several coils are interconnected so as to develop along the axis of the casing a number of consequent magnetic poles making the device multipolar in character. As shown in the drawings there are thirty-six coils, which, when connected as shown, develop six consequent poles along the axis of the plunger.

Suppose, for example, that we have a triphase circuit $a$, $b$, $c$, as indicated, and that current at a given instant enters the motor system by the wire $a$ and returns by wires $b$ and $c$. Dividing at the point $d$, one branch will proceed through coils 1 and 2, developing, say, a north pole to the right, will then pass through coils 7 and 8 in a reverse direction, developing a south pole at the point indicated, will then pass through coils 13 and 14 in the same direction, developing poles as indicated, thence through coils 19 and 20, thence to coils 25 and 26, thence to coils 31 and 32, and out by wire $b$. The other branch starting from the point $d$ will pass by wire $e$ to coils 35 and 36, thence to coils 29 and 30, thence to coils 23 and 24, thence to coils 17 and 18, thence to coils 11 and 12, thence to coils 5 and 6, developing a series of poles displaced longitudinally with reference to the set developed by the other branch. By the co-operation of the two branches consequent poles will be developed at equal intervals along the series of coils, and by the fluctuation of the alternating currents these poles will be shifted longitudinally in orbits whose length is determined by the space occupied by the group of coils developing them. In the system shown in the diagram this orbit will be limited to the space occupied by six coils, coils 1, 2, 3, 4, 5, 6, for example, with which the wires $a$, $b$, $c$, connect in groups of two limiting the extent to which the poles will shift.

It will be evident that a greater or less number of coils might be assembled in each group and that these coils might be spaced so as to develop a greater number of poles. The substantial result of the polar movement is to create a magnetic polar wave along the axis of the coils which will gradually shift from one end to the other, because at the instant a pole of one sign reaches the limit of its orbit at the end of one group of coils, the reversal of current reverses the pole, thus developing along the axis of the coils a continuous shifting of the poles in one direction so long as the order of delivery of the several alternating currents remains the same. The teeth of the laminated plates in the body of the plunger form an easy magnetic path for the lines of force developed by the several groups of coils. Around the plunger, which is formed of iron, may be a series of closed copper rings F, F which become the seat of induced currents, developing induced poles in the plunger which increases the force of its thrust. These rings may be arranged in any suitable manner but will preferably be less in number than the coils, or at least unsymmetrically arranged with respect to the coils so that some of them will always be out of alignment with the poles, and thus prevent dead points or sticking. With the systems of connections just described it is evident that the polar wave would travel continuously in one direction depending upon the order of sequence of current in the wires $a$, $b$, $c$, and the plunger would be forced in that direction but would not automatically return.

In my prior application above noted the return motion was effected by commutating the currents periodically so that after a definite number of alternations during which the plunger would make its stroke the order of sequence of the alternating currents was changed so as to produce a return of the polar wave. In my present invention this end is effected without the use of a commutator by using a generator of peculiar construction which is provided with a plunger or field-magnet G connected to any suitable reciprocating engine, as, for example, to the piston of a steam engine as shown in the drawings where a steam cylinder H has its piston rod directly connected to the plunger, the slide valve being shifted by tappets or in any other suitable manner. Upon this plunger may be wound a series of coils supplied with a continuous current in any convenient manner, said coils being wound to produce a series of poles of opposite sign along the plunger, as indicated in the lower portion of Fig. 1. The plunger G is reciprocated within a casing constructed similarly to that of the motor, the several coils 1 to 36 contained in the casing being connected together in a manner similar to the coils described in connection with the motor, so that as the plunger is reciprocated and the consequent poles set up at a given longitudinal point by the continuous current generator are shifted back and forth through the coils 1 to 36, alternating currents will be developed in the mains $a$, $b$, $c$, which, so long as the plunger moves in one direction, will have a definite order of delivery, but when it reverses its direction of movement the order of delivery will be changed. It will thus be seen that no commutator is required but the alternating currents will be delivered on the mains $a$, $b$, $c$ by the movement of the generator in a way that will insure the reciprocation of the motor.

From the construction hereinbefore described it will be evident that so long as the plunger of the generator is moving in a definite direction there will be tractive effort in a definite direction upon the plunger of the motor, and when the plunger of the generator reverses its direction of movement the order of delivery of the currents being changed will automatically reverse the direction of tractive effort upon the plunger of the motor.

Having thus described my invention, what I claim as new, and desire to secure by Letters Patent, is—

1. A system for transmitting power, comprising a generator provided with a normally charged field-magnet and an armature wound with two or more circuits longitudinally displaced, means for producing a relative reciprocatory movement and thereby developing polyphase currents in the armature, a line circuit connected to the armature, and a reciprocatory motor provided with a polyphase winding connected to the line circuit.

2. A system for transmitting power, comprising a multipolar reciprocatory generator provided with a polyphase winding on its armature and normally charged field-magnet, and a multipolar polyphase reciprocatory motor in circuit with the generator.

3. A system for transmitting power, comprising a reciprocatory electric generator having an armature wound with a series of coils spaced at intervals along a longitudinal axis connected with a differential phase circuit, a normally charged field-magnet and means for producing a relative reciprocatory movement whereby differential phase alternating currents having periodic changes in their order of delivery are generated, and a reciprocatory polyphase electric motor cooperating with said generator.

4. A reciprocatory electric generator, comprising an armature wound with a series of coils spaced at intervals along a longitudinal axis and provided with terminals for a polyphase circuit, a normally charged field-magnet cooperating with the armature, and means for producing a relative reciprocatory movement whereby differential phase alternating currents having periodic changes in their order of delivery are generated.

5. A reciprocatory electric generator, comprising an armature having a series of coils spaced at intervals along a longitudinal axis coupled in closed circuit and adapted at three or more points for connection with a differential phase alternating current circuit, a multipolar normally charged field-magnet having a number of poles corresponding to the number of armature coils of like phase, and means for producing a relative reciprocatory movement of the armature and field-magnet.

In testimony whereof I have hereunto subscribed my name this 8th day of September, A. D. 1893.

CHARLES S. BRADLEY.

Witnesses:
J. D. CARSON,
CYRUS ALLEN.